United States Patent
Sheffield et al.

(10) Patent No.: US 9,990,767 B1
(45) Date of Patent: Jun. 5, 2018

(54) GENERATION OF 3D MODELS USING STOCHASTIC SHAPE DISTRIBUTION

(71) Applicant: Lowe's Companies, Inc., Mooresville, NC (US)

(72) Inventors: Mason E. Sheffield, Woodinville, WA (US); Oleg Alexander, Bothell, WA (US); Jonothon Frederick Douglas, Kirkland, WA (US); Guillermo Enrique Baeza, Mooresville, NC (US)

(73) Assignee: LOWE'S COMPANIES, INC., Mooresville, NC (US)

( * ) Notice: Subject to any disclaimer, the term of this patent is extended or adjusted under 35 U.S.C. 154(b) by 0 days. days.

(21) Appl. No.: 15/791,940

(22) Filed: Oct. 24, 2017

(51) Int. Cl.
*H04N 5/228* (2006.01)
*G06T 17/00* (2006.01)
(Continued)

(52) U.S. Cl.
CPC .............. *G06T 17/00* (2013.01); *G06T 7/529* (2017.01); *G06T 7/586* (2017.01); *G06T 15/04* (2013.01); *G06T 19/20* (2013.01); *H04N 5/2256* (2013.01); *H04N 5/2354* (2013.01); *H04N 5/23222* (2013.01); *H04N 5/23296* (2013.01); *H04N 5/247* (2013.01); *G06K 9/4609* (2013.01); *G06T 7/60* (2013.01); *G06T 7/73* (2017.01); *G06T 2207/10152* (2013.01); *G06T 2207/20212* (2013.01)

(58) Field of Classification Search
CPC ......... G06T 17/00; G06T 15/04; G06T 19/20; G06T 7/586; G06T 7/529; G06T 2207/10152; G06T 2207/20212; G06T 7/60; G06T 7/73; H04N 5/23296; H04N 5/23222; H04N 5/2256; H04N 5/247; G06K 9/4609

USPC ...................................................... 348/222.1
See application file for complete search history.

(56) References Cited

U.S. PATENT DOCUMENTS 9,444,977 B2 * 9/2016 Moesle ................ H04N 17/004
2007/0285560 A1 * 12/2007 Perlman ................ G06T 1/0007
  348/371

(Continued)

OTHER PUBLICATIONS

U.S. Appl. No. 15/586,207, U.S. Patent Application, filed May 3, 2017, Titled: Automated Matrix Photo Framing Using Range Camera Input.

*Primary Examiner* — Yogesh Aggarwal
(74) *Attorney, Agent, or Firm* — Kilpatrick Townsend & Stockton LLP

(57) ABSTRACT

Described herein are a system and methods for generating 3D models using imaging data obtained from an array of camera devices. In embodiments, a stochastic shape distribution may be applied upon an object to be modeled in invisible ink. The system activates a first lighting mode which causes the stochastic shape distribution to be visible and captures a first set of images that depict the stochastic shape distribution on the object. The system then activates a second lighting mode that causes the stochastic shape distribution to be hidden and captures images of the object as it would normally appear (without the stochastic shape distribution). The images having the stochastic shape distribution may be used to determine alignment information for the images within the set of images. That alignment information may then be attributed to the second set of images and used to generate the 3D model.

27 Claims, 8 Drawing Sheets

(51) Int. Cl.
  *G06T 15/04*    (2011.01)
  *G06T 19/20*    (2011.01)
  *G06T 7/586*    (2017.01)
  *H04N 5/247*    (2006.01)
  *H04N 5/225*    (2006.01)
  *H04N 5/235*    (2006.01)
  *H04N 5/232*    (2006.01)
  *G06T 7/529*    (2017.01)
  *G06T 7/60*    (2017.01)
  *G06K 9/46*    (2006.01)
  *G06T 7/73*    (2017.01)

(56) References Cited

U.S. PATENT DOCUMENTS

2013/0215235 A1* 8/2013 Russell .............. H04N 13/0203
                                                        348/47
2015/0256813 A1* 9/2015 Dal Mutto ........... G06K 9/2036
                                                        348/47
2016/0088275 A1* 3/2016 Fuchikami ............. G03B 21/14
                                                        348/744
2017/0046868 A1* 2/2017 Chernov .................. G06T 7/73

\* cited by examiner

US 9,990,767 B1

GENERATION OF 3D MODELS USING STOCHASTIC SHAPE DISTRIBUTION

BACKGROUND

In a number of industries, three-dimensional (3D) models may be used to represent various objects. For example, any industry that uses or sells objects may need to understand how different objects interact or how they might appear together. The generation of such a 3D model may require that a system obtain an image of the surface of an object, which may be rendered or displayed as a two-dimensional image via 3D rendering or displayed as a three-dimensional image.

Although 3D models may be solid models that define a volume of the object, they more likely include a shell or boundary that represent at surface of the object, with the image obtained for an angle mapped to that surface. These types of boundary representation 3D models are commonly used in industries that use 3D models.

Various techniques exist for generating 3D models from objects. For example, a given object may be scanned from a number of different angles, and the scanned images can then be combined to generate the 3D image of the object. In some embodiments, the scanned image information may include a matrix of images taken from each angle, which may be obtained from an array of cameras. However, there are a number of problems and inefficiencies in mapping images from a matrix of images into a single 3D model. For example, an image's relative position to other images in the array of images may be hard to determine. This is especially true if the object being modeled has few or no distinguishing marks.

In some conventional methods, a system may use structured light patterns to match up images and determine a geometry of the object. However, this technique can be inaccurate if the object being modeled is transparent or reflective. One possible solution to this problem is to apply a coating to the object. For example, images of the object can be obtained first without the coating to in order to obtain visual information for the object. The coating is then applied to the object and a second set of images can be obtained using structured light patterns, which may be used to calculate a geometry and/or texture of the object. However, it is difficult to coat the object without moving it, which presents farther difficulties in mapping the visual information obtained from the first set of images to the geometry calculated from the second set of images as the positioning must be reconciled.

Embodiments of the invention address these and other problems, individually and collectively.

SUMMARY

Techniques described herein are directed to a system and methods for generating a 3D model of an object using stochastic distributions of shapes (e.g., of invisible ink) applied on the object. A stochastic distribution may include any distribution that may be analyzed statistically but may not be predicted precisely (e.g., a random distribution). In some embodiments, the stochastic shape distribution is applied onto one or more surfaces of the object prior to staging the object on a positioning platform. An image, or an array of images, of the object is then captured from a number of different angles. To do this, the object may be placed upon a staging or positioning platform capable of rotating, or otherwise repositioning, the object. The object may be placed within an area in which the lighting may be controlled. In particular, the system may be configured to use multiple lighting modes to illuminate the object. One or more sets of images of the object may be taken of the object from a number of different angles in order to obtain a 360° view of the object.

During a collection of images of the item, the system may capture a first set of images under a first lighting condition, switch to a second lighting condition, and capture a second set of images. The object may then be rotated to expose a different angle of the object to the array of cameras. This may be repeated a number of times to capture images of the object from all angles under each of the lighting conditions. One of the set of images of the object may depict the stochastic shape distribution applied on the object. The images that depict the stochastic shape distribution may be used to generate a geometry for the object. In some embodiments, the geometry may be an object boundary (e.g., a wire mesh). The images that do not depict the stochastic shape distribution may be used to generate a texture map for the object.

One embodiment of the disclosure is directed to a method of generating a 3D model by an array of cameras, comprising applying a stochastic distribution of shapes upon an object, the stochastic distribution of shapes being applied using a substance which is visible under a first lighting condition, capturing a first set of images under the first lighting condition, each image of the first set of images depicting at least a portion of the stochastic shape distribution applied on the object, capturing a second set of images under a second light condition, each image of the second set of images depicting at least a portion of the object with the stochastic shape distribution not visible, mapping each image from the first set of images to a corresponding image of the second set of images, determining, using the portion of the stochastic shape distribution, relative positions of each of the images within the first set of images, determining, based on the mapping, relative positions of each of the images within the second set of images, and generating a 3D model from at least the first set of images and the second set of images.

Another embodiment of the disclosure is directed to a 3D modeling system comprising one or more camera devices, one or more lighting fixtures, a processor, and a memory including instructions that, when executed with the processor, cause the 3D modeling system to, at least: cause the one or more lighting fixtures to activate a first light mode to illuminate an object such that a stochastic shape distribution on the object is made visible, capture at least one first image of the object, the at least one first image including a depiction of at least a portion of the object and the stochastic shape distribution, cause the one or more lighting fixtures to activate a second light mode to illuminate the object such that a stochastic shape distribution on the object is not visible, capture at least one second image of the object, the at least one second image including a depiction of the portion of the object without the stochastic shape distribution, determine position information for the at least one first image based upon the stochastic shape distribution, and generate a 3D model of the object using the at least one first image and the at least one second image based on the determined position information.

Yet another embodiment of the disclosure is directed to a control unit apparatus comprising a control unit communicatively coupled to an array of cameras and a lighting apparatus, the control unit configured to: provide instructions to the lighting apparatus to cause a first lighting mode to be activated, provide instructions to the array of cameras to cause the array of cameras to capture first image information related to an object, the first image information including at least a stochastic shape distribution applied upon the object, provide instructions to the lighting apparatus to cause a second lighting mode to be activated, provide instructions to the array of cameras to cause the array of cameras to capture second image information related to an object, the second image information not including the stochastic shape distribution, receive, from the array of cameras, the first image information and the second image information, and generate, based on the stochastic shape distribution and a relationship between the first image information and the second image information, a 3D model of the object.

BRIEF DESCRIPTION OF THE DRAWINGS

Various embodiments in accordance with the present disclosure will be described with reference to the drawings, in which.

DETAILED DESCRIPTION

Figure 1:
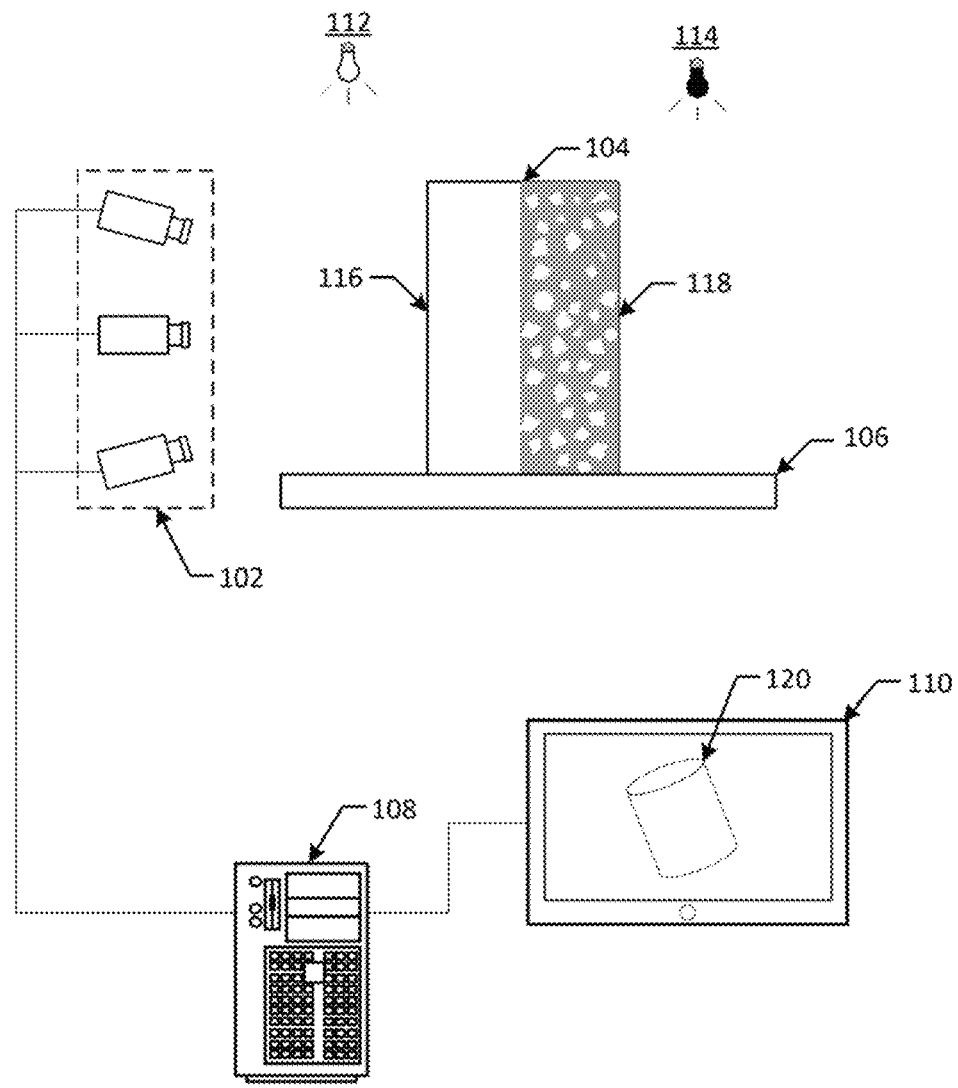
FIG. 1 depicts an illustrative example of a system capable of generating a 3D model in accordance with embodiments of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to a system in which multiple lighting modes are used in conjunction with invisible ink in order to generate a 3D model of an object. In particular, the system uses an array of cameras, different lighting modes, and a stochastic distribution of invisible ink applied upon an object for which the 3D model is to be generated. The stochastic shape distribution may be used by the system to map relationships between various images captured using the array of cameras as well as to determine a geometry of the object. In the described system, transparent and/or reflective objects can be modeled using the system without applying a coating to that object (which is typically required in systems that use light patterns projected onto an object). Because the stochastic shape distribution is invisible under normal lighting conditions, the stochastic shape distribution does not disrupt the capture of an object's color/image information. Additionally, the object need not be moved between capture of color/image information for an object and capture of geometry information for that same object (e.g., in order to coat the object). Because of the multiple advantages of the described system over conventional systems, a 3D model generated using the system is more accurate and is more efficiently generated (as the information need not be adjusted to account for even minor movements).

In the described system, an object to be modeled may have applied upon it, for example by printing, a stochastic shape distribution. The stochastic shape distribution may comprise any combination of shapes of various sizes and is applied using a substance which may only be visible under certain lighting conditions. The object may then be placed upon a staging platform in order to generate a 3D model of that object. In order to generate the 3D model, the system captures a number of sets of images under multiple lighting modes. For example, the object may be rotated a number of times via the staging platform. As the object is rotated, the system may activate a first lighting mode (under which the stochastic shape distribution is visible) capture a first set of images (e.g., a matrix of images), deactivate the first lighting mode and activate a second lighting mode (under which the stochastic shape distribution is not visible), capture a second set of images, identify relationships between the first set of images and the second set of images, identify a relative position for each of the images in at least one of the sets of images, and generate a 3D model from the image information. An example of a process in which a number of matrices of images may be obtained and used to generate a 3D model is described in U.S. patent application 15/586,207 to Sheffield et. al., which is herein incorporated by reference in its entirety.

FIG. 1 depicts an illustrative example of a system capable of generating a 3D model in accordance with embodiments of the disclosure. In FIG. 1, an array of cameras 102 may be used to capture image information related to an object 104 positioned upon a positioning platform 106. In some embodiments, the array of cameras can be used with a turntable, where an object is rotated and photos are taken from multiple different angles. In other embodiments, a full array of cameras can be used without a turntable. The difference between a turntable system and a full array is that a turntable simulates the presence of hundreds of cameras, whereas a full array is literally composed of hundreds of cameras. In a full array system, there is no turntable, and cameras (around 100-150) are typically arranged facing inward to scan the object in the center. A reason one might want to build such a full array system as opposed to a turntable system is to scan people, who tend to move during a scan. A full array permits scanning of a person almost instantaneously, avoiding issues with movement of the person. As used herein, an "array of cameras" is the use of multiple cameras with or without a turntable. Other embodiments can include an array of cameras extending around, for example, half of an object (or some other subsection of the area around an object) and a turntable that rotates the object once by 180 degrees to bring the other half of the object into view of the array (or rotates the object by some other angle so that a different number of partial rotations bring the other subsections of the object into view of the camera array). Examples of this might include; (a) a camera array extending approximately 120-degrees around the turntable and a turntable which rotates in three distinct increments of approximately 120-degrees, (b) a camera array extending approximately a quarter of the way around the turntable and a turntable that rotates for each capture in four distinct increments of approximately 90-degrees), (c) a camera array extending approximately a fifth of the way around the turntable and a turntable that rotates for each capture in five distinct increments of approximately 72-degrees), or the like. The rotation increments can be substantially equal (e.g., in the number of degrees), but they do not need to be. In this regard, a full capture can be achieved even if the extent of each rotational increment is varied. Still other embodiments can be implemented without a turntable, for example, by using an array of cameras that is mounted, for example, on a track or rail and is adapted to be moved around the object and capture all the required images without needing to rotate the object. Other embodiments can be implemented using a combination of a turntable and a camera array that is movable around the turntable. In yet another embodiment, a single camera could be used to capture all images needed, but such a system is typically very slow to use.

The array of cameras 102 and the positioning platform 106 may be in communication with, and controlled via, a control unit 108. The control unit 108 may be in further communication. with a number of interface devices 110, which may be used to present graphical data and receive input from a user of the system.

For clarity, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communication protocol.

In some embodiments, a stochastic shape distribution may be applied upon the object 104 using a form of invisible ink. The invisible ink may be applied, for example, by printing, splattering, spraying, painting, dipping, or another application method. A stochastic shape distribution has the appearance of noise with a uniform random distribution. The stochastic shape distribution may include a distribution in which a number of shapes are randomly positioned. Additionally, the shapes may be random (e.g., have a random form, size, orientation, etc.). Invisible ink may include any substance which is visible when illuminated using a first range of light wavelengths and invisible when illuminated using a second range of light wavelengths. For example, the invisible ink may include a substance which fluoresces under, or absorbs, particular wavelengths of light (e.g., ultraviolet light).

The system depicted in FIG. 1 may use multiple lighting modes. For example, the system may implement a first lighting mode using a first lighting apparatus 112. In some embodiments, the first lighting mode may be one associated with white light, or light that contains all of the wavelengths of the visible spectrum at equal, or nearly equal, intensity. The system may implement a second lighting mode using a second lighting apparatus 114. In some embodiments, the second lighting mode may be one in which the light emitted is outside of a visible spectrum. For example, the second lighting mode ma involve the emission of ultraviolet light, or light within a range of 10 nm to 400 nm.

The object may exhibit different visual appearances depending upon the lighting mode that is implemented at any given time. In particular, the object may exhibit a first appearance 116 upon implementation of the first lighting condition and a second appearance 118 upon implementation of the second lighting condition. For example, where the first lighting condition involves the emission of white light, the object may exhibit a normal appearance, or an appearance that the object would typically exhibit under normal lighting conditions. In this example, the stochastic shape distribution applied upon the object 104 in invisible ink may not be detectable by the cameras 102 under the first lighting conditions. Images captured by the array of cameras may capture the object's normal appearance without capturing the stochastic shape distribution. However, the stochastic shape distribution may fluoresce or otherwise become detectable by the cameras 102 under the second lighting condition. Images captured by the array of cameras 102 under the second lighting condition may capture the stochastic shape distribution applied upon the object. The system may be configured to switch between lighting conditions during an image capture phase of a process for generating 3D models. For example, the system may capture a set of images under the first lighting condition, switch to the second lighting condition, and capture a second set of images.

A control unit 108 may be any computing device configured to capture image information using, the array of cameras 102 and generate a 3D model 120. Interface devices 110 may include any input/output (I/O) devices capable of presenting information to a user and/or receiving input from a user. At least one example of a control unit 108 and interface devices 110 is described in more detail with respect to FIG. 2 below.

Figure 2:
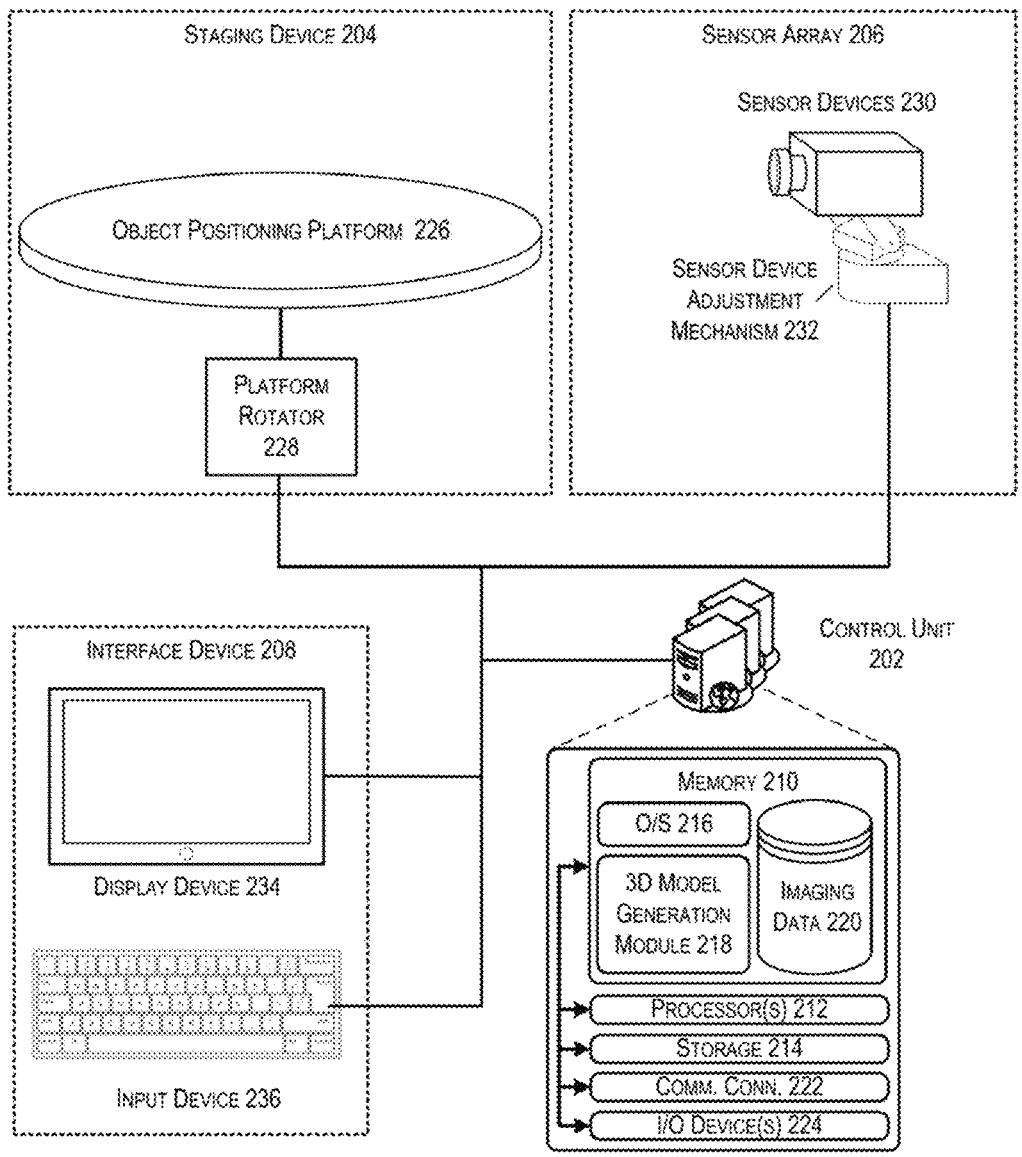
FIG. 2 depicts a system architecture for a 3D imaging system that utilizes multiple lighting modes and a stochastic shape distribution to generate 3D models in accordance with at least some embodiments.

FIG. 2 depicts a system architecture for a 3D imaging system that utilizes multiple lighting modes and a stochastic shape distribution to generate 3D models in accordance with at least some embodiments. In FIG. 2, a control unit 202 may be in communication with a number of other components, including at least a staging device 204, a sensor array 206, and interface devices 208. The control unit 202 may be an example of the control unit 108 described with respect to FIG. 1. The interface devices 208 may be an example of the interface devices 110 described with respect to FIG. 1.

The control unit 202 may be any type of computing device configured to capture images of an object and generate a 3D model. In some embodiments, the control unit 202 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the control unit 202 may include at least one memory 210 and one or more processing units (or processor(s)) 212. The processor(s) 212 may be implemented as appropriate in hardware, computer-executable instructions, firmware or combinations thereof. Computer-executable instruction or firmware implementations of the processor(s) 212, may include computer-executable or machine executable instructions written in any suitable programming language to perform the various functions described.

The memory 210 may store program instructions that are loadable and executable on the processor(s) 212, as well as data generated during the execution of these programs.

Depending on the configuration and type of control unit 202, the memory 210 may be volatile (such as random access memory (RAM)) and/or non-volatile (such as read-only memory (ROM), flash memory, etc.). The control unit 202 may also include additional storage 214, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 210 may include multiple different types of memory, such as static random access memory (SRAM), dynamic random access memory (DRAM) or ROM. Turning to the contents of the memory 210 in more detail, the memory 210 may include an operating system 216 and one or more application programs or services for implementing the features disclosed herein including at least a module for mapping images captured under different lighting modes to a composite image and generating a 3D model (3D model generation module 218). The memory 210 may also include imaging data 220, which provides information associated with the 3D imaging system (e.g., images captured using the system). In some embodiments, the imaging data 220 may be stored in a database.

The memory 210 and the additional storage 214, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are installed on and/or executed From the control unit 202. The control unit 202 may also contain communications connection(s) 222 that allow the control unit 202 to communicate with a stored database, another computing device or server, user terminals, and/or other components of the imaging system. The control unit 202 may also include input/output (I/O) device(s) and/or ports 224, such as for enabling connection with a keyboard, a mouse, a pen, a voice input device, a touch input device, a display, speakers, a printer, etc.

Turning to the contents of the memory 210 in more detail, the memory 210 may include an operating system 216, a database containing imaging data 220 and the one or more application programs or services for implementing the features disclosed herein, including a 3D model generation module 218.

In some embodiments, the 3D model generation module 218 may be configured to, in conjunction with the processors 212, capture image information for an object under multiple lighting modes, map images obtained under a first lighting mode to images obtained under a second lighting mode, identity relationships between various images captured under a single lighting mode, generate a composite image based on those relationships, and generate a 3D model from multiple composite images based on mappings between images. In some embodiments, the control unit 202 may initiate first lighting mode and cause the sensor devices 230 to capture image information under the first lighting mode. The 3D model generation module 218 may then initiate a second lighting mode and cause the sensor devices 230 to capture image information under the second lighting mode. Under at least one of the lighting modes, a stochastic shape distribution may be depicted on item in the captured images.

The 3D model generation module 218 may be configured to identify elements of the stochastic shape distribution that exist within multiple images. In some embodiments, the 3D model generation module 218 may identify elements that are likely to be mapped to multiple images based on the known relative, location of the images within a matrix of images and an approximate overlap value. Upon identifying elements common to multiple images, the 3D model generation module 218 may be configured to identify a geometry/texture (e.g., a wire mesh) of the object based on distortions of the elements as depicted within each of the two images. The 3D model generation module 218 may then generate composite geometry/texture information using geometry information determined from each of the images. Images captured using the other lighting mode may be used to generate a texture map and may be mapped to a surface of the geometry information in order to create a 3D model. A number of these composite images may be used to generate 3D model.

In some embodiments, a staging device 204 may be any device or structure configured to manipulate a position of an item for the purpose of obtaining image information. Staging platform 104 described in FIG. 1 may be an example staging device 204. In some embodiments, the staging device 204 may include an object positioning platform 226 and a platform rotator 228. The object positioning platform 226 may be a rotatable platform upon which one or more items can be placed for imaging of the items using the sensor array 206. In some embodiments, the rotatable platform may be configured to be rotated by the platform rotator 228 in order to reposition the item on the platform. The platform rotator 228 may be a motor configured to, upon receiving instructions from the control unit 202, activate and cause the object positioning platform to rotate.

In some embodiments, the sensor array 206 may include a number of sensor devices 230 and one or more sensor device adjustment mechanisms 232. The sensor devices 230 may include a number of camera devices, which may be cameras configured to capture image information. The array of cameras 102 depicted in FIG. 1 may be an example of a sensor array 206 that may be implemented. In some embodiments, the sensor array 206 may include a number of camera devices arranged in an array. For example, the sensor array 206 may include camera devices arranged in a matrix (e.g., in rows and columns). In another example, the sensor array 206 may include a number of cameras arranged in a single column. Each of the camera devices in the array of camera devices may be positioned (e.g., given a tilt and position) to capture image information with respect to a particular respective field of view. In some embodiments, each of the camera devices may be configured to be repositioned in order to alter that camera device's tilt, pan, and/or level of magnification to capture an image of a specified field of view.

The sensor device adjustment mechanism 232 may be any mechanism having means for adjusting a pan, tilt, and/or position of one or more sensor devices 230. In some embodiments, the sensor device adjustment mechanism 232 may be a mechanical or robotic arm. In some embodiments, the one or more sensor devices may be arranged on a track or rail, in which case the sensor device adjustment mechanism 232 may include a means for moving the sensor device along the track or rail. In some embodiments, the one or more sensor devices may be arranged on a tripod or pole, in which case the sensor device adjustment mechanism 232 may include a means for providing angular rotation for the sensor devices. One skilled in the art, after considering the teachings of this disclosure, would easily recognize a number of sensor device adjustment mechanisms that may be employed with the disclosed system.

In some embodiments, the 3D imaging system may include an interface device 208. An interface device may include any combination of display device 234 and/or input device 236. In some embodiments, each of the display device 234 and the input device 236 may be separate devices which are communicatively coupled. The display device 234 may include any means for presenting information to a user or users. In some embodiments, the display device 234 may include outputs for audio presentation of data. In some embodiments, the display device 234 may be wearable. For example, the display device 234 may be a virtual reality (VR) or augmented reality (AR) headset.

The input devices 236 may be any device configured to receive input from a user and convert that input into machine executable instructions. In some embodiments, the input devices 236 may include mouse, keyboards, joysticks, or any other suitable means of receiving user input. In some embodiments, the interface device 208 may be used, in conjunction with the control unit 202, to manipulate the sensor array 206 and/or components of the staging device 204. In some embodiments, the user may provide an indication of one or more desired operational characteristics and the control unit 202 may automatically adjust one or more properties of the sensor array 206 and/or components of the staging device 204 in accordance with the desired operational characteristics.

Figure 3:
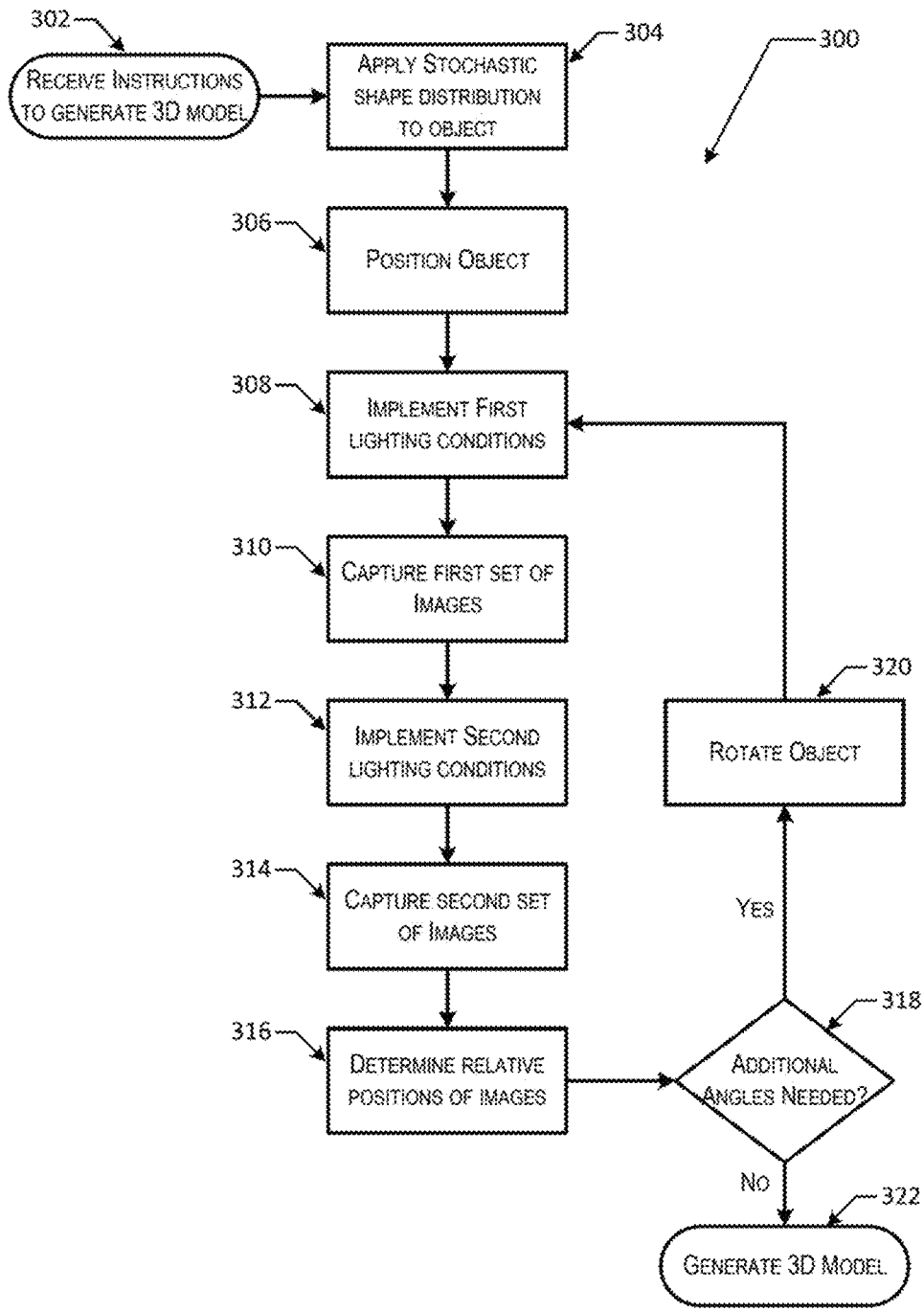
FIG. 3 depicts a flow chart illustrating a process for generating a 3D model using a stochastic distribution of invisible ink in accordance with at least some embodiments.

FIG. 3 depicts a flow chart illustrating a process for generating a 3D model using a stochastic distribution of invisible ink in accordance with at least some embodiments. Some or all of the process 300 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. Process 300 may be performed by an example sensor array 206, a control unit 202, and various other components, each of which is depicted with respect to FIG. 2.

Process 300 may begin at 302, when instructions are received to generate a 3D model. In some embodiments, the instructions may be received via an input device in communication with a control unit. Upon receiving the instructions, the system may detect a size and/or shape of the object for which the 3D model is to be generated. For example, the system may use depth information (e.g., a range map obtained from a range camera) or an image processing technique (using image information obtained from a camera device) to detect a boundary of the object to be modeled. In some embodiments, the system may receive an indication of an amount of overlap that should be maintained in relation to a matrix of images to be obtained.

At 304, a stochastic shape distribution is applied onto the object in invisible ink. In some embodiments, the stochastic shape distribution may be painted or drawn onto the object by an artist. In some embodiments, the stochastic shape distribution may be sprayed onto the object using a paint sprayer or other suitable device. In some embodiments, the stochastic shape distribution may be created by splattering the object with the invisible ink. It should be noted that a number of suitable techniques are known to one skilled in the art and any process that results in a stochastic shape distribution being applied upon the object should be recognized as being an equivalent to those described.

At 306, the object may be positioned in front of a camera array. In some embodiments, this may involve placing the object upon a positioning platform. The object may or may not be secured to the positioning platform. For example, in some embodiments, the object may be fastened to the positioning platform using a vice, or another suitable fastener, so that the object retains its pose relative to the positioning platform while it is rotated. In some embodiments, the object may simply be placed upon the positioning platform. The positioning platform may be configured to rotate the object by any suitable amount. In some embodiments, the positioning platform may be configured to rotate the object in predetermined increments (e.g., 15° each rotation).

At 308, the system may activate a first lighting condition. To do this, the system may turn on a first set of lights. In some embodiments, the first set of lights may be configured to emit a range of light wavelengths that cause the stochastic shape distribution applied on the object to become visible to the array of cameras used to capture image information for the object. For example, in some embodiments, the first set of lights may include lights that emit wavelengths within an ultraviolet spectrum (e.g., black Lights). In this example, the ultraviolet light, which typically has a wavelength which is shorter than light within a visible spectrum, will hit the invisible ink in the stochastic shape distribution. The light reflected from the stochastic shape distribution will have a longer wavelength, and will hence be within the visible spectrum. In this way, the stochastic shape distribution applied in invisible ink may be made visible to a conventional camera device.

At 310, the system may capture a first set of images under the first lighting condition. In some embodiments, an array of cameras may be configured to capture a matrix of images. For example, each camera in the array of cameras may be configured to capture an image of a particular section of the object. The sections of the object for which images are obtained may be compiled to form a matrix, or grid, of images. The images in the matrix of images may share at least some overlap, which may be used to identify relative positions for each of the images within the matrix of images. In some embodiments, this overlap between images within the matrix of images may be adjusted (e.g., by increasing or decreasing an area captured by each camera in the array of cameras).

At 312, the system may switch to a second light condition. To do this, the system may turn off the first set of lights and may turn on a second set of lights. The second set of lights may be configured to emit a range of light wavelengths that causes the stochastic shape distribution applied on the object to remain invisible to the array of cameras used to capture image information for the object. For example, in some embodiments, the second set of lights may include lights that emit wavelengths within a normal visible, spectrum (e.g., white lights).

At 314, the system may capture a second set of images under the second light conditions. The second set of images may be captured using the same array of cameras as used in step 310 described above. In some embodiments, the second set of images may be captured without altering a position or optical properties (e.g., zoom, focus, etc.) of the cameras in the array of cameras. The second set of images captured by the array of cameras may depict the object as it appears under normal lighting conditions (e.g., lighting conditions in which all of the wavelengths of the visible spectrum are represented at equal, or nearly equal, intensity). In other words, the second set of images may depict the object without the stochastic shape distribution. It should be noted that steps 308 through 314 may be performed in an alternative order. For example, the steps 312 and 314 may be performed prior to the steps 308 and 310 in some embodiments.

At 316, the system may determine relative positions for each of the images within a matrix of images. In some embodiments, the system may determine relative positions or each of the images in a particular set of images and may attribute those positions to corresponding images in another set of images. For example, the system may determine relative positons for each of the images in the first set of images. In this example, the relative positions may subsequently be attributed to the images in the second set of images by virtue of being captured by the same camera using the same optical properties. To do this, the system may identify similar features in each of two images in the set of images and may align those images based on the identified similar features. The efficiency of this process may be increased when the system already knows which images share adjacencies. For example, the system may be aware that a first image is next to, or overlaps with, a second image. The system may identify features of the first image in the estimated overlap area. Once identified, the system may attempt to locate those same features within the estimated overlap area of the second image. This process is described in greater detail with respect to FIG. 5 below.

At 318, the system may determine whether additional sets of images are required. For example, in the scenario in which the positioning platform is configured to rotate the object in 15° increments, the system may require 24 sets of images before a full 360° of images may be obtained for the object. In this example, if the system determines that less than 24 sets of images have been obtained, then the system may determine that additional images are required. If additional sets of images are required (a yes decision in the flow chart), the system may cause the object to be rotated at 320 and may repeat at least steps 308 through 316.

Otherwise, if additional sets of images are not required (a no decision in the flow chart), then at 322 the system may generate a 3D model from the collected images. Once each of the sets of images is captured, those sets of images may be used to generate different parts of the 3D model. In some embodiments, each of the first set of images may be used to generate a geometry (e.g., a wire mesh) of the object and each of the second set of images may be used to generate an appearance (e.g., a texture map) for the object. When generating a 3D model from the captured sets of images, the system may map the texture map onto a surface of the geometry.

Figure 4:
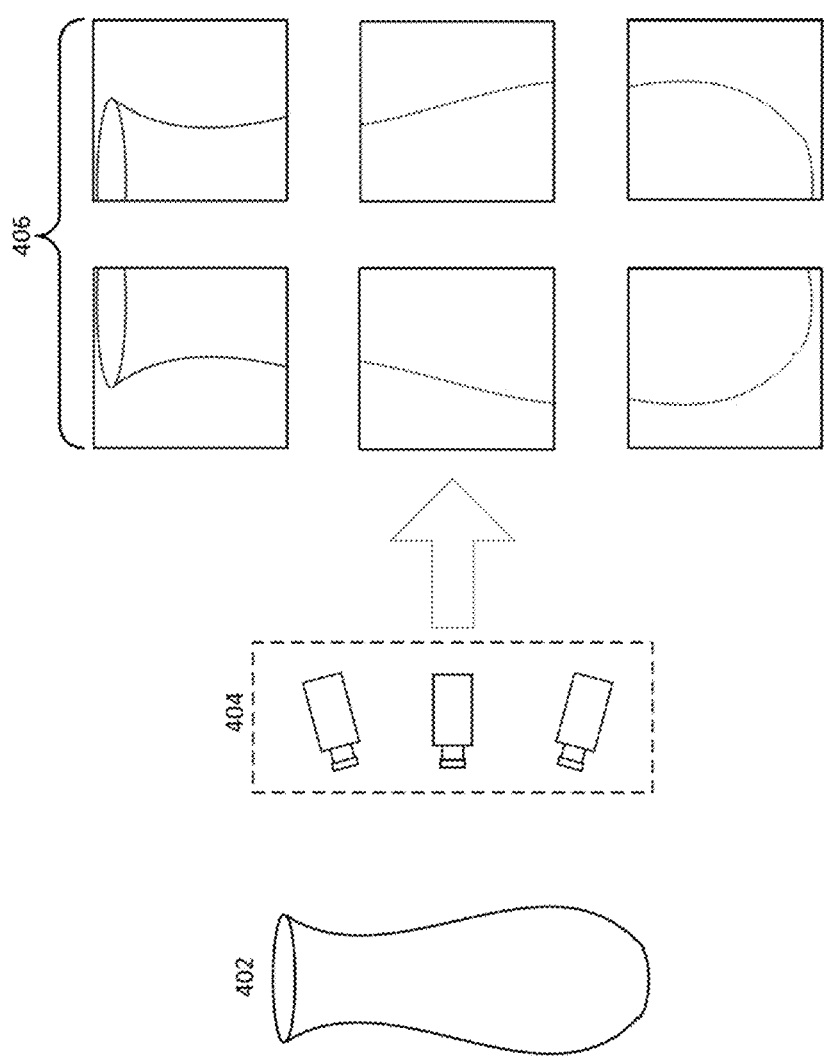
FIG. 4 depicts a first illustrative example of a technique for capturing a matrix of images from an array of cameras in accordance with at least some embodiments.

FIG. 4 depicts a first illustrative example of a technique for capturing a matrix of images from an array of cameras in accordance with at least some embodiments. In FIG. 4, an object 402 may be illuminated using lighting conditions that cause a stochastic shape distribution applied on the object to remain hidden (or otherwise undetected by the cameras 404). Accordingly, each camera in an array of cameras 404 may capture images that depict a portion of the object as it would appear under normal lighting conditions. In some embodiments, the captured images may be arranged in a matrix of images 406.

In some embodiments, the system may be capable of correlating features depicted within at least one of the images with similar features depicted within the other images. However, if the object 402 is relatively featureless, then it may be difficult or impractical to identity a relative position of each of the images in the matrix of images 406. Instead, the system may store each image's position within the matrix. For example, the system may store an indication that an image is related to column 2, row 3 of the matrix of images 406.

Figure 5:
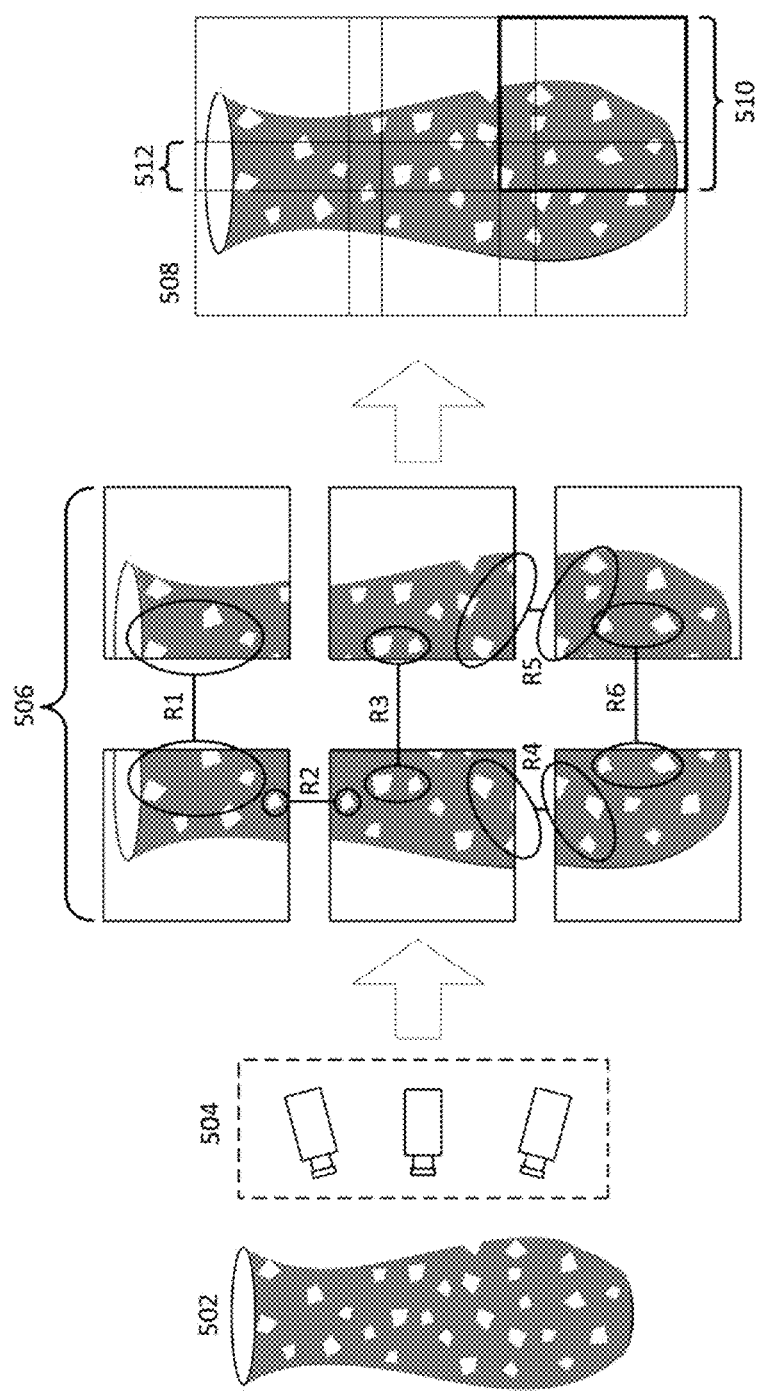
FIG. 5 depicts a second illustrative example of a technique for capturing a matrix of images from an array of cameras in accordance with at least some embodiments.

FIG. 5 depicts a second illustrative example of a technique for capturing a matrix of images from an array of cameras in accordance with at least some embodiments. In FIG. 5, the object 502 may be illuminated using lighting conditions that cause the stochastic shape distribution to be illuminated or otherwise detectable by the array of cameras 504. Accordingly, each camera in an array of cameras 504 may capture images that depict a portion of the object as well as the applied stochastic shape distribution. In some embodiments, the captured images may be arranged in a matrix of images 506.

In some embodiments, the system may be capable of correlating features depicted within at least one of the images with similar features depicted within the other images. In particular, the system may identify similarities in features of the stochastic shape distribution depicted within each of the images in order to determine a relative position of each of those images. For example, reference points R1 through R6 illustrate similarities that may be used to identify relative positions for each of the images within the matrix of images 506. Once these similarities have been identified, each of the images within the matrix of images may be aligned based on those identified similarities in order to generate a composite image 508. In some embodiments, a geometry may be calculated for the matrix of images based on distortions in the stochastic shape distribution detected between various images.

In FIG. 5, a composite image 508 is depicted in which information from a number of separate images (e.g., image 510) has been combined. To create the composite image, the identified reference points R1 through R6 are used to align (e.g., identify a relative position for) the images. The reference points R1 through R6 may lie within an overlap 512 of the images. This enables the system to generate the composite image by concatenating image information from each of the images based on the determined relative position.

Figure 6:
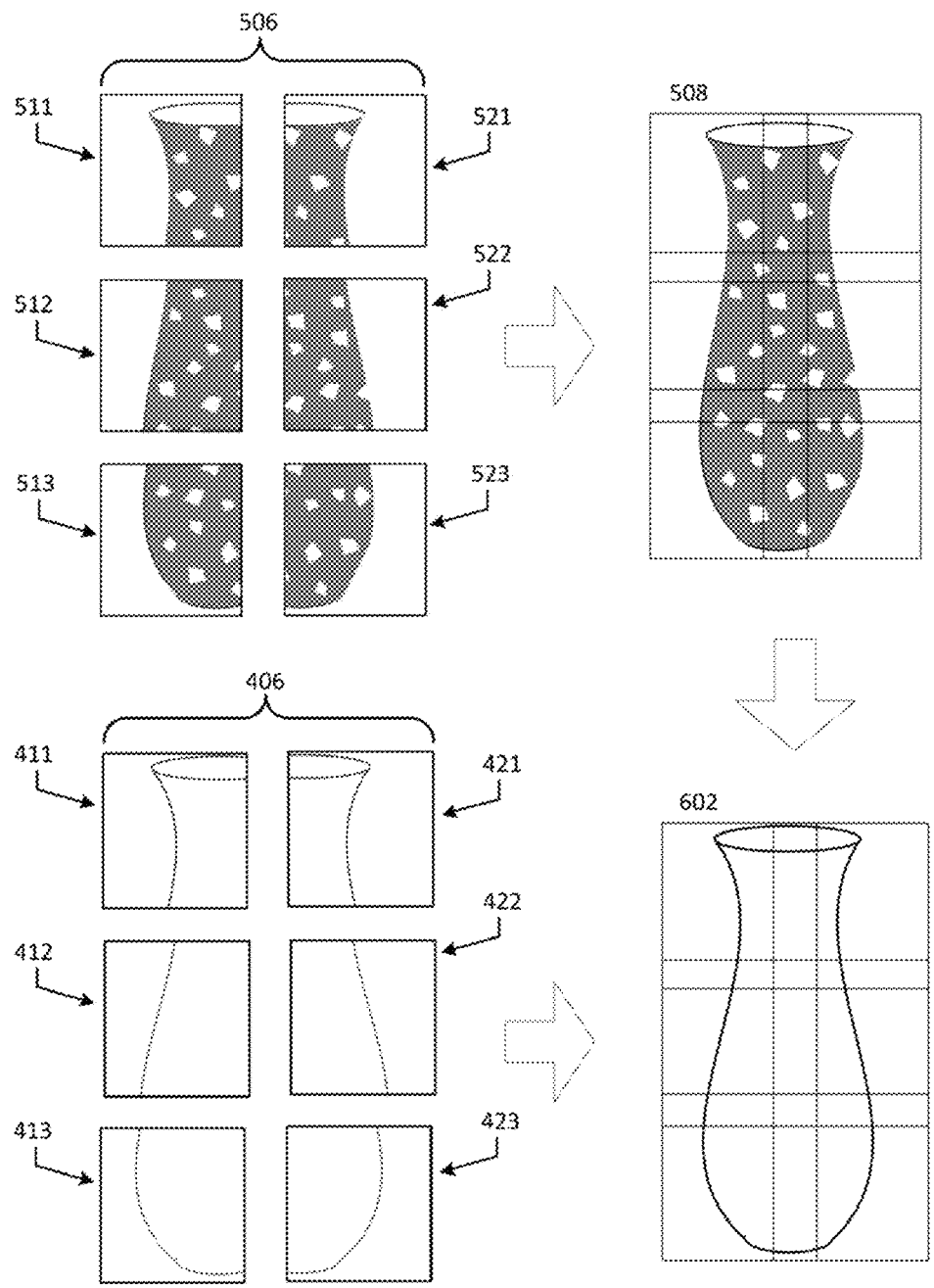
FIG. 6 depicts a technique for defining relationships between images from different sets of images in order to determine a relative position of each of the images.

FIG. 6 depicts a technique for defining relationships between images from different sets of images in order to determine a relative position of each of the images within its respective set. In FIG. 6, two or more sets of images (e.g., matrices of images) may be captured by an array of cameras. In this example, each camera in an array of cameras captures at least one image in which the stochastic shape distribution is illuminated (or is otherwise detectable by the cameras) and at least one image in which the object is visible but the stochastic shape distribution is not illuminated (or remains otherwise undetected by the cameras).

In FIG. 6, a first matrix of images 506 is depicted as a set of images captured by an array of cameras in which the stochastic shape distribution is illuminated (or is otherwise visible and detected by the cameras). Matrix 506 corresponds to the matrix of images 506 described with respect to FIG. 5 above. Also depicted is a second matrix of images 406. Matrix of images 406 is depicted as a set of images captured by the array of cameras in which the stochastic shape distribution is not visible (or otherwise remains undetected by the cameras), and corresponds to the matrix of images 406 described with respect to FIG. 4 above.

As described above, each of the images in the first matrix of images 506 may be used to generate a composite image 508 (corresponding to composite image 508 of FIG. 5). However, in some embodiments, the images in the second set of images 406 may include insufficient distinguishable features to generate a composite image. In that case, each of the images of the second matrix of images 406 may be mapped to a corresponding image from the first set of images 506. For example, images may be captured and stored for each of the sets of images with an indication of their place within a matrix. In this example, images that share a common position within each of the matrices may have been obtained using the same camera device. For example, image 411 (column 1, row 1) of the matrix of images 406 may be correlated to image 511 (also column 1, row 1) of the matrix of images 506 by virtue of being obtained by the same camera device. In this example, the system may determine that the camera settings remained constant between the capture of each of the images and so the portion of the object depicted in each of the correlated images is the same. Accordingly, the system may generate a second composite image 602 based on the first composite image 508 as well as based upon the relationships between the images in the matrix of images 506 and the matrix of images 406. In other words, the system may align the images of the matrix of images 406 in the same manner as the system has aligned the images in the matrix of images 506, regardless of whether the matrix of images 406 contains any identified reference points.

Figure 7:
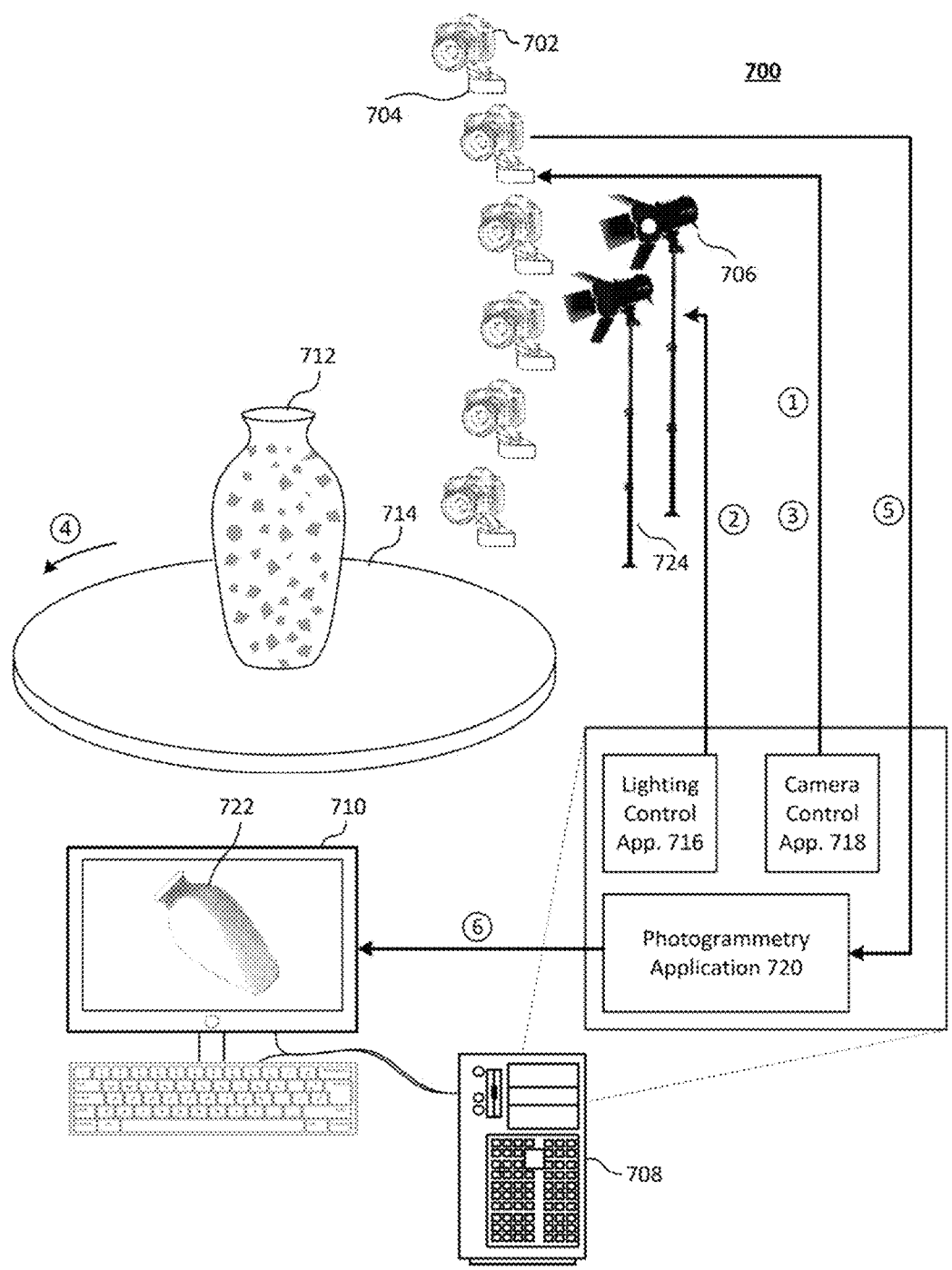
FIG. 7 depicts one potential implementation of the described system for generating 3D models using a stochastic distribution of invisible ink in accordance with the disclosure.

FIG. 7 depicts one potential implementation of the described system for generating 3D models using a stochastic distribution of invisible ink in accordance with the disclosure. The implementation depicted in FIG. 7 is provided for illustrative purposes and is not intended to be limiting.

In FIG. 7 is depicted an array of cameras 702, each of which is mounted on a robotic pan/tilt platform 704. In this particular implementation, suitable cameras 702 may include a number of Canon EOS 5DS R cameras which each have a 50.6 Megapixel sensor and the low -pass filter (LPF) effect cancelled in order to provide greater fine-edge sharpness and detail. Additionally, suitable robotic pan/tilt platforms 704 may include any device upon which a camera 702 maybe mounted which is capable of achieving a specified position of the camera. The robotic pan/tilt platforms 704 may have a number of servomotors or other actuators capable of positioning each camera 702 to a particular pan/tilt (e.g., by rotating the camera 702 along a horizontal or vertical axis) and may be an example of a sensor device adjustment mechanism 232 as depicted in FIG. 2.

Also depicted is a lighting apparatus 706 and a second lighting apparatus 724. In this particular implementation, the lighting apparatus may be any suitable lighting fixture capable of activating at least two different light modes. In some embodiments, the lighting apparatus may be fitted with at least two different light bulbs for implementing the different lighting modes. For example, the lighting apparatus 706 may include a bulb that operates at a range of 400-700 nm to produce white light. The second lighting apparatus 724 may include a bulb that emits light of a range of wavelengths associated with ultraviolet (e.g., about 10 nm to 400 nm). Other methods of emitting ultraviolet lights may be employed (e.g., Ultraviolet LEDs or Ultraviolet Transmitting, Visible Absorbing Filters). The lighting apparatus may be configured to be controlled electronically by a control unit 708. In some embodiments, the lighting apparatus may include multiple separate light fixtures that surround an object.

Each of the cameras 702, robotic pan/tilt platforms 704, and lighting apparatus 706 are depicted as being coupled with a control unit 708. Control unit 708 may be any suitable computing device capable of performing the functions described herein and may be an example control unit 202 as depicted in FIG. 2. As described above, the control unit 708 is in communication with an interface device 710, which may be an example interface device 208 as depicted in FIG. 2.

Additionally depicted is an object 712 (a vase in this example) staged on an object positioning platform 714. The object positioning platform 714 may be a turntable capable of rotating the object around a vertical axis and may be an example object positioning platform 226 as depicted in FIG. 2. If a turntable is not used, such as with a full array of cameras (described previously), then the object positioning platform 714 can be any structure for receiving the item being scanned. The object positioning platform 714 may also be in communication with the control unit 708, which may provide instructions to the object positioning platform 714 to cause it to reposition the vase 712.

In the depicted implementation, the control unit 708 may include a number of applications configured to interact (e.g., via application programming interfaces (APIs)) to generate a 3D model of the vase 712. In particular, the control unit 708 may include at least a lighting control application 716, a camera control application 718, and a photogrammetry application 720. The lighting control application 716 may be any application capable of remotely altering (e.g., activating and/or deactivating) one or more lighting modes emitted by a lighting apparatus 706 and 724.

The camera control application 718 may be any application capable of remotely changing camera settings and causing the cameras in the array of cameras 702 to capture image information in accordance with a determined field of view. One such suitable camera control application 718 may be the SMART SHOOTER photography software application provided by the KUVACODE software company. SMART SHOOTER is capable of being driven by a script, which enables capturing a series of different photos without manual operation of the camera 702. In some embodiments, the control unit 708 may generate instructions to be executed by each of the lighting control application 716 and the camera control application 718. For example, a 3D model generation module of the control unit 708 may generate a script, which may then be executed by the SMART SHOOTER software application. For the purposes of this disclosure, a script may be any set of instructions (e.g., in a text file) that contains commands for an application to carry out. For the SMART SHOOTER software application, Tool Command Language (TCL) is used as the scripting language.

The photogrammetry application 720 may be any application capable of generating a 3D model representation 722 from image information captured in accordance with embodiments of the disclosure. Some suitable photogrammetry applications 720 may include AGISOFT PHOTOSCAN photogrammetry software application and CAPTURINGREALITY photogrammetry software application, both of which are capable of performing photogrammetric processing of digital images and generating 3D spatial data (e.g. 3D models).

The exemplary system depicted in FIG. 7 is capable of capturing images of an object 712 and generating a 3D model representation 722 of that object. At step 1 of a process in which a 3D model representation 722 is generated from a vase 712, the control unit 708 may cause each of the cameras in the array of cameras to be positioned via the camera control application 718. In some embodiments, each of the cameras in the array of cameras may be positioned to capture a particular section of the object 712. The SMART SHOOTER software application may provide instructions to each of the cameras 702 and/or the robotic pan/tilt platforms 704 to achieve an appropriate field of view. At step 2, the control unit 708 may provide a set of instructions to the lighting control application 716 to cause it to select a first lighting mode. The control unit 708 may then cause the camera control application 718 to execute a script in order to capture a first set of images at step 3. Next, the control unit 708 may repeat steps 2 and 3 for a second lighting mode. In particular, the control unit 708 may provide a set of instructions to the lighting control application 716 to cause it to select the second lighting mode. The control unit 708 may then cause the camera control application 718 to once more execute the generated script in order to capture a second set of images. In some embodiments, the control unit 708 may interact with the lighting control application 716 and/or the SMART SHOOTER software application via an API.

Image information is captured by the cameras 702 (e.g., an image matrix). Once the image information has been received by the control unit 708, the turntable (i.e., the object positioning platform 714) may be rotated to reposition the vase 712 at step 4. Steps 1-4 may then be repeated until a full set of images has been obtained. If a full array of cameras is used, step 4 is skipped. Image information captured by the cameras 702 may be relayed to the AGISOFT PHOTOSCAN software application (i.e., the photogrammetry application 720) executed on the control unit 708 at step 5 for each of die separate lighting modes, at which point it may generate a 3D model representation at step 6.

It should be noted that the system described herein is capable of capturing a complete set of images (e.g., all images needed to generate a full 3D model) within 180 seconds, regardless of the number of cameras used, For example, the exemplary system depicted in FIG. 7, having six cameras arranged in an arced column, may be configured to capture images of an item 712 positioned on the turntable. Assuming in this example that the turntable is provided instructions to reposition the item 712 in 15° increments, the system is capable of capturing 288 images (6 cameras×24 positions×2 lighting modes) (each image captured with a Canon EOS 5DS R camera having a resolution up to 50.6 megapixels) within 180 seconds and generating an accurate 3D model using those images within 3 hours (using the corresponding photogrammetry application 720). Accordingly, the implementation of the system described, having the specific components depicted, is capable of capturing a large number of high -resolution images within a short period of time using the techniques described herein. The number of images that may be captured by an array of cameras in a single scan, as well as the level of detail in those images, depends upon the number of cameras used in the described system. As the number of cameras increases, the resolution of the 3D model can be increase and/or the time it takes to capture all of the images necessary for a 3D model can be decreased (e.g., by reducing the number of scans needed). For example, if additional cameras are added to the array of cameras that are arranged to capture more surface area of the object around a vertical axis, then fewer rotations/scans would be needed to obtain a full set of images, or rotation can be eliminated entirely, as when a full array of cameras is used. In some embodiments, although the time in which images may be captured may or may not change with the number of cameras used, the time that the photogrammetry application 720 takes to generate 3D models from those images will increase non-linearly with the number of cameras. Likewise, the resolution may increase or decrease with the number of cameras used. For example, adding additional cameras to the array of cameras may decrease a field of view assigned to each of the cameras and cause each camera to zoom in. The increased number of cameras would also increase the number of images captured in the matrix of images. Because the resolution of each image remains the same the increased number of images in the matrix of images results in a higher overall resolution for the matrix of images, with each camera capturing more detail in its respective image. The system in this example therefore is able to generate accurate and high-definition 3D models based on 7.286 Gigapixels of images within 3 hours. This corresponds to a high-definition 3D model generation rate a more than 2.42 Gigapixels per hour. Additionally, there is no need to disrupt the 3D model generation process in order to apply a coating to the object. This cuts out any processing time that may be wasted on this operation in a conventional system and eliminates the processing required to map texture images to geometry images.

Figure 8:
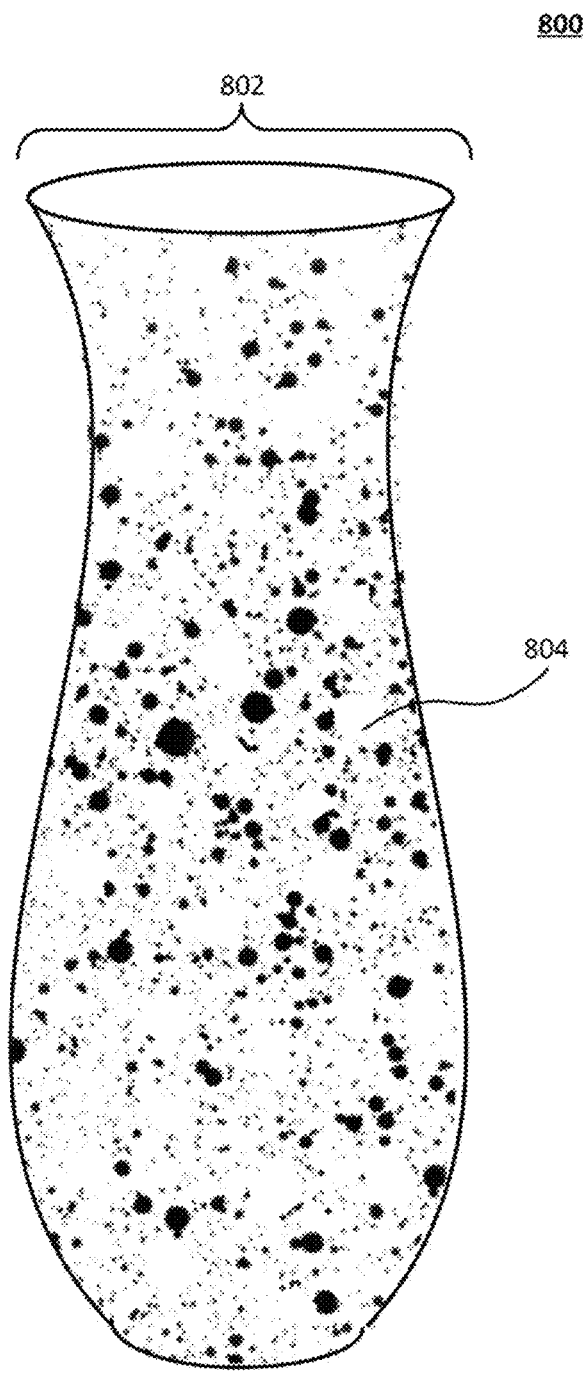
FIG. 8 depicts an exemplary stochastic shape distribution that may be applied to an object in accordance with at least some embodiments.

FIG. 8 shows an exemplary stochastic shape distribution that may be applied to an object in accordance with at least some embodiments. As depicted, an object 802 may have applied to it a stochastic shape distribution 804 with an appearance of noise having a uniform random distribution. In some embodiments, the stochastic shape distribution 804 may be applied to the object 802 by splattering the object with a substance.

Although the disclosure focuses primarily on embodiments in which a stochastic shape distribution is applied using a substance that is only visible under certain lighting conditions, it should be noted that there are a number of ways to capture images of the object with and without the stochastic shape distribution while maintaining image alignment. Some embodiments may not involve applying a substance to the object. For example, in some embodiments, the stochastic shape distribution may be projected onto the object using light that is only visible under certain conditions. In these embodiments, camera lens filters may be used to filter out that light. In these embodiments, the system may maintain the same lighting conditions throughout the image collection process, in that the object may be illuminated using white (or natural) light as well as having a stochastic shape distribution projected upon it using a second type of light. The cameras, under a first imaging configuration, may be able to capture image information that includes the stochastic shape distribution projected upon the object, whereas the cameras, under a second imaging configuration (by using a lens filter), may be unable to capture image information that includes the stochastic shape distribution projected upon the object while being able to capture image information for the object itself.

By way of illustrative example, in at least some embodiments, the stochastic shape distribution 804 may be projected onto the object 802 using polarized light. In this example, a polarized filter may be positioned between the object and a lens of the camera. The polarized filter may be configured to be rotated by 90° from a first imaging configuration to a second imaging configuration. In this example, an image of the object 802 may be captured using a first imaging configuration in which the polarized light is able to pass through the filter. The polarized filter may then be rotated by 90° in order to activate a second imaging configuration. Because the majority of the polarized light reflected off the object will not be able to pass through the polarized filter in the second imaging configuration, the stochastic shape distribution will not be visible to the camera. Accordingly, the image captured by the camera in the second configuration will not include the stochastic shape distribution. It should be noted that embodiments of the disclosure may include any suitable technique for ensuring that a stochastic shape distribution is visible while capturing one set of images and invisible while capturing another set of images while maintaining the position of the object.

In at least some embodiments, the stochastic shape distribution 804 may be projected onto the object 802 using infrared or UV light. In this example, an infrared or UV filter may be positioned between the object and a lens of the camera to provide a first imaging configuration. In this example, an image of the object 802 may be captured using the first imaging configuration while the infrared or UV light is blocked by the filter. Because infrared or UV light reflected from the object will not be able to pass through the filter in the first imaging configuration, the stochastic shape distribution will not be visible to the camera. The filter can be removed from the path of light entering the camera to provide a second imaging configuration. In the second imaging configuration, the camera is able to sense the stochastic shape distribution of the infrared or UV light (e.g., when the camera is equipped with image sensor(s) adapted to sense UV or infrared light in addition to visible light). The first and second imaging configurations need not be implemented with the first configuration happening first and the second configuration happening second. The imaging process can start with the second imaging configuration and be followed by the first imaging configuration.

Embodiments of the invention provide for a number of technical advantages. For example, the system described herein is able to accurately and efficiently generate 3D models of objects which are difficult for conventional systems to model. In particular, the system is able to more efficiently generate 3D models for objects that are reflective, transparent, and/or dark in color. In conventional systems that use light patterns, the light patterns projected upon such an object might become distorted because of the object's material properties. Typically, this is remedied in such conventional systems by applying a coating to the object which prevents the light pattern from being distorted while allowing the system to capture geometry/texture data. However, the coating hides the object's color and appearance. This means that in a conventional system, images of an object must first be captured without a coating in order to obtain appearance information. The object must then be coated and a second set of images must be captured to obtain geometry for the object. However, because the images are captured during separate imaging sessions, each image in the set of appearance images must be mapped to the images captured with the coating. This can be problematic if the object has been moved even slightly and can result in a texture map that is "off" from the geometry. In contrast, individual sets of images of the object can be captured almost simultaneously using the system described herein. The object is not moved between captures and the images associated with the object's appearance can be directly mapped to the images captured with respect to the object's geometry, as each of the two sets of images are captured using the same cameras, which are in the same position.

Furthermore, when capturing appearance information to create a texture map, it may be difficult for a conventional system to establish relative locations of each of the images within an image matrix. This often requires the use of sophisticated machine vision techniques to identify similar features within each image. However, when an object is relatively featureless, machine vision techniques may be ineffective. One way that this can be remedied is to capture a larger area of the object with each camera device, increasing the overlap between each image and increasing the possibility that distinguishing features may be identified. However, because this requires that the camera zoom out, the captured appearance information is less detailed. This is remedied by the system described herein by mapping the relatively featureless appearance data to images captured that include the stochastic shape distribution. Since it is easier to define relative positions of the geometry data (because of the stochastic shape distribution), this allows the system to identify a relative location of each of the appearance images on the premise that they were captured using the same camera as the one used to capture the geometry data. Hence, the described system can identify relative positions of the set of appearance images more efficiently, and using less data than conventional systems.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or, other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards. flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compel Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y and/or Z). Thus, such disjunctive language is not generally intended to, and should not, imply that certain embodiments require at least one of X, at least one of Y, or at least one of Z to each be present.

Preferred embodiments of this disclosure arc described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this, disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be it by reference and were set forth in its entirety herein.

What is claimed is:

1. A method of generating a 3D model by an array of cameras, comprising:
 applying, upon an object, a stochastic shape distribution of noise, the stochastic shape distribution of noise being applied using a substance which is visible under is first lighting condition;
 capturing a first set of images under the first lighting condition, each image of the first set of images depicting at least a portion of the stochastic shape distribution applied on the object;
 capturing a second set of images under a second lighting condition, each image of the second set of images depicting at least a portion of the object with the stochastic shape distribution not visible;
 mapping each image from the first set of images to a corresponding image of the second set of images;
 determining, using the portion of the stochastic shape distribution, a first set of relative positions of each of the images within the first set of images;
 determining, based on the mapping, a second set of relative positions of each of the images within the second set of images; and
 generating a composite image from the second set of images based on the determined second set of relative positions.

2. The method of claim 1, wherein the composite image is a texture map for the portion of the object.

3. The method of claim 1, further comprising:
 rotating the object to at least a second position;
 capturing additional sets of images;
 generating at least one second composite image from the additional sets of images; and
 generating a 3D model using the at least one second composite image and the composite image.

4. The method of claim 1, wherein the first lighting condition comprises the emission of light within an ultraviolet wavelength.

5. The method of claim 1, wherein the second lighting condition comprises the emission of white light.

6. The method of claim 1, wherein determining relative positions of images within the first set of images comprises identifying similar features within multiple images of the first set of images and aligning the multiple images based on the identified similar features.

7. A 3D modeling system comprising:
 one or more camera devices;
 one or more lighting fixtures;
 a processor; and
 a memory including instructions that, when executed with the processor, cause the 3D modeling system to, at least;
  cause the one or more lighting fixtures to activate a first light mode to illuminate an object such that a stochastic shape distribution on the object is made visible;
  cause the one or more camera devices to capture at least one first image of the object, the at least one first image including a depiction of at least a portion of the object and the stochastic shape distribution;
  cause the one or more lighting fixtures to activate a second light mode to illuminate the object such that a stochastic shape distribution on the object is not visible;
  cause the one or more camera devices to capture at least one second image of the object, the at least one second image including a depiction of the portion of the object without the stochastic shape distribution;
  determine a position information for the at least one first image based upon the stochastic shape distribution; and
  generate a 3D model of the object using the at least one first image and the at least one second image based on the determined position information.

8. The 3D modeling system of claim 7, further comprising a positioning platform, wherein the object is positioned upon the positioning platform and the positioning platform is configured to rotate the object.

9. The 3D modeling system of claim 7, wherein the one or more lighting fixtures includes at least two light sources, wherein one of the two light sources is associated with the first light mode and the other of the two light sources is associated with the second tight mode.

10. The 3D modeling system of claim 7, wherein the stochastic shape distribution is applied on the object in invisible ink.

11. The 3D modeling system of claim 10, wherein the stochastic shape distribution is created by at least one of splattering or spraying the object with the invisible ink.

12. The 3D modeling system of claim 10, wherein the stochastic shape distribution is created by it least one of painting or dipping the object with the invisible ink.

13. The 3D modeling system of claim 7, wherein the instructions further cause the 3D modeling system to attribute the determined position information for the at least one first image to the at least one second image.

14. A 3D modeling apparatus comprising:
 a control unit communicatively coupled to one or more cameras, the control unit configured to:
  provide instructions to activate a first imaging configuration, the first imaging configuration being one in which a stochastic shape distribution applied to an object is visible to the one or more cameras;
  provide instructions to the one or more cameras to cause the one or more cameras to capture first image information related to the object, the first image information including at least the stochastic shape distribution applied to the object;
  provide instructions to activate a second imaging configuration, the second imaging configuration being one in which the stochastic shape distribution applied to the object is not visible to the one or more cameras;
  provide instructions to the one or more cameras to cause the one or more cameras to capture second image information related to the object, the second image information including the object without the stochastic shape distribution;
  receive, from the one or more cameras, the first image information and the second image information; and
  generate, based on the stochastic shape distribution and a relationship between the first image information and the second image information, a 3D model of the object.

15. The 3D imaging apparatus of claim 14, wherein providing instructions to the one or more cameras to cause the one or more cameras to capture image information comprises generating a script to be executed by an application which controls the one or more cameras.

16. The 3D imaging apparatus of claim 14, wherein the relationship between the first image information and the second image information comprises a correlation in position between the first image information and the second image information.

17. The 3D imaging apparatus of claim 16, wherein the correlation in position is determined by virtue of images being captured by the same camera in the one or more cameras.

18. The 3D imaging apparatus of claim 14, wherein a position of each of the cameras in the one or more cameras is not altered between capturing the first image information and the second image information.

19. The 3D imaging apparatus of claim 14, wherein the first image information includes geometry information for the object.

20. The 3D imaging apparatus of claim 14, wherein the second image information includes appearance information for the object.

21. A method of generating a 3D model by an array of cameras, comprising:
   applying, upon an object, a stochastic shape distribution of noise, the stochastic shape distribution of noise being applied using a substance which is visible to at least one of the cameras under a first imaging condition;
   capturing a first set of images under the first imaging condition, each image of the first set of images depicting at least a portion of the stochastic shape distribution applied on the object;
   capturing a second set of images under a second imaging condition, each image of the second set of images depicting at least a portion of the object with the stochastic shape distribution not visible to at least one of the cameras;
   mapping each image from the first set of images to a corresponding image of the second set of images;
   determining, using the portion of the stochastic shape distribution, a first set of relative positions of each of the images within the first set of images;
   determining, based on the mapping, a second set of relative positions of each of the images within the second set of images; and
   generating a composite image from the second set of images based on the determined second set of relative positions.

22. The method of claim 21, wherein the composite image is a texture map for the portion of the object.

23. The method of claim 21, further comprising;
   rotating the object to at least a second position;
   capturing additional sets of images;
   generating at least one second composite image from the additional sets of images; and
   generating a 3D model using the at least one second composite image and the composite image.

24. The method of claim 21, wherein the first imaging condition comprises the emission of light within an ultraviolet wavelength.

25. The method of claim 21, wherein the second imaging condition comprises the emission of white light.

26. The method of claim 21, wherein determining relative positions of images within the first set of images comprises identifying similar features within multiple images of the first set of images and aligning the multiple images based on the identified similar features.

27. The method of claim 21, wherein the first imaging condition involves passage of light representing the stochastic shape distribution into the at least one camera, and the second imaging condition involves filtering of the light representing the stochastic shape distribution so that the light representing the stochastic shape is not detected by the at least one camera.

* * * * *